United States Patent
Schuessler et al.

(10) Patent No.: US 8,188,839 B2
(45) Date of Patent: May 29, 2012

(54) TRUNCATION, COMPRESSION, AND ENCRYPTION OF RFID TAG COMMUNICATIONS

(75) Inventors: Frederick Schuessler, Baiting Hollow, NY (US); Anne Schuessler, Baiting Hollow, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 1346 days.

(21) Appl. No.: 11/529,606

(22) Filed: Sep. 29, 2006

(65) Prior Publication Data
US 2007/0069866 A1    Mar. 29, 2007

Related U.S. Application Data

(60) Provisional application No. 60/721,574, filed on Sep. 29, 2005.

(51) Int. Cl.
*H04Q 5/22* (2006.01)
(52) U.S. Cl. ........................ 340/10.2; 340/10.4
(58) Field of Classification Search .............. 340/10.2, 340/10.3, 10.4, 10.5, 7.44; 345/202; 710/64
See application file for complete search history.

(56) References Cited

U.S. PATENT DOCUMENTS

| | | | |
|---|---|---|---|
| 6,196,466 B1 * | 3/2001 | Schuessler | 235/494 |
| 7,009,526 B2 * | 3/2006 | Hughes et al. | 340/825.49 |
| 7,158,030 B2 * | 1/2007 | Chung | 340/572.1 |
| 2004/0066279 A1 | 4/2004 | Hughes et al. | |
| 2004/0257203 A1 | 12/2004 | Maltsev et al. | |
| 2005/0093679 A1 | 5/2005 | Zai et al. | |

OTHER PUBLICATIONS

Search Report and Written Opinion for International Application No. PCT/US06/37869, mailed on Aug. 30, 2007, 10 pages.
EPCglobal Powered by GS1—Specification for RFID Air Interface; EPC(TM) Radio-Frequency Identify Protocols Class-1 Generation-2 UHF RFID Protocol for Communications at 860 MHz-960 MHz Version 1.0.9; Copyright (c)2004 EPCglobal Inc (T); pp. 66-94—All Rights Reserved—Jan. 31, 2005 Website: http://www.gs1.org/gsmp/kc/epcglobal/uhfc1g2/uhfc1g2_1_0_9-standard-20050126.pdf.

* cited by examiner

*Primary Examiner* — Vernal Brown
(74) *Attorney, Agent, or Firm* — Terri Hughes Smith; Kenneth A. Haas

(57) ABSTRACT

Methods, systems, and apparatuses for RFID tags, RFID readers, communications algorithms, and RFID-related applications are described herein. In an aspect of the invention, an RFID tag is capable of storing data, receiving a signal from a reader, determining a response taking into account the tag mode and the data, and transmitting a response to the reader. The data includes a first plurality of bits and a second plurality of bits. The tag mode may be set by a current or a prior command by the reader. Depending on the tag mode, the response may be complete, or the second plurality of bits may be truncated, compressed, or encrypted. In an aspect of the invention, the response includes an implicit indication of whether the response is complete, truncated, encrypted, or compressed. In another aspect of the invention, a command from the reader indicates how many bits should be truncated, compressed, or encrypted.

60 Claims, 9 Drawing Sheets

TRUNCATION, COMPRESSION, AND ENCRYPTION OF RFID TAG COMMUNICATIONS

CROSS REFERENCE TO RELATED APPLICATIONS

This application claims the benefit of U.S. Provisional Application No. 60/721,574, entitled "Truncation of Serialized RFID Tag Inventories," filed Sep. 29, 2005, incorporated herein by reference in its entirety.

This application is related to the subject matter disclosed in U.S. Pat. No. 6,196,466, entitled "DATA COMPRESSION METHOD USING MULTIPLE BASE NUMBER SYSTEMS," which is commonly assigned, and which is incorporated herein by reference in its entirety.

BACKGROUND OF THE INVENTION

1. Field of the Invention

The invention relates to radio frequency identification (RFID) technology, and in particular, to communications with RFID tags.

2. Background Art

Radio frequency identification (RFID) tags are electronic devices that may be affixed to items whose presence is to be detected and/or monitored. The presence of an RFID tag, and therefore the presence of the item to which the tag is affixed, may be checked and monitored wirelessly by devices known as "readers." Readers typically have one or more antennas transmitting radio frequency signals to which tags respond. Because the reader "interrogates" RFID tags, and receives signals back from the tags in response to the interrogation, the reader is sometimes termed as "reader interrogator" or simply "interrogator" or "reader."

With the maturation of RFID technology, efficient communication between tags and readers has become a key enabler in supply chain management, especially in manufacturing, shipping, and retail industries, as well as in building security installations, healthcare facilities, libraries, airports, warehouses, etc.

One of the most significant concerns of RFID system design is the optimization of tag throughput rates. The number of tags successfully processed per second has a direct impact on the feasibility of RFID in many applications. When interrogating a large population of tags, some of the most important parameters are the bit data rate of the tag-to-reader channel, the ability of the protocol to minimize collisions, and the amount of data to be transferred from each tag. For a given bit rate and protocol, an implementation that minimizes the amount of over-the-air data transfer will have a distinct competitive advantage. Some of the data transfer is "overhead" (polling, acknowledging, select commands, etc), but a large percentage is a tag's "payload," such as the serialized EPC number in retail tags. Of that payload, a large and growing percentage is devoted to the serialization portion which is unique down to each actual item. Item-level uniqueness is one of RFID's major advantages over bar coding, and many new RFID applications will undoubtedly make good use of this capability. Being able to track item-level uniqueness also raises both security and privacy issues. From an implementation standpoint, encryption resembles compression but without a decrease in size.

However, many instances of current inventory practice tend to ignore serial numbers, and track only down to Stock Keeping Units (SKUs) or the equivalent. For this and many other current and future RFID applications, the serial number portion of each tag's identifier (sometimes called ID) is "thrown away," but the communication of this unused data from every tag within range of the reader still uses up a significant portion of the air interface bandwidth.

For example, in current practice when 96-bit EPC Generation 2 (Gen 2) data specification tags are used for identifying individual cases on a pallet, each tag encodes a "sGTIN-96" identifier. For that identifier, almost 40% of the payload bits are devoted to the serial-number portion. The serial number portion is not needed in many inventory applications, and is discarded. This inefficiency may significantly worsen in future practice. In the near future, tags will use the full-capacity "sGTIN-198" version of the identifier. In this case, nearly 71% of the payload is devoted to serialization.

In other applications, the serial number information is needed and thus is not discarded. However, the number of transmitted bits of serialization data defined in the Gen 2 protocol was optimized for simplicity, not speed. For example, the alphanumeric data in an sGTIN-198 identifier is represented and transmitted at seven bits per character. More complex but more bit-efficient encoding schemes are known in the art, such as the "ISO 646 Encodation Mode" of the EAN.UCC Composite symbology. This mode supports the full character set in the serial number, but it uses only needs four bits per decimal digit, and seven bits per alphabetic character. More bits are needed only for the rarely-used punctuation characters.

A need for reducing the transmitted payload is present. In the current EPC Gen 2 case, once a reader has transmitted a selection mask, so that, for example, only tags whose EPC begins with "11010" are allowed to reply, then the transmitted tag replies do not need to include the initial "11010" because the reader already knows that all valid replies will begin with the selected bit pattern. Thus, the EPC Gen 2 spec provides an explicit reader command to the tags to truncate their replies by leaving off the known leading portion of their identifier, thus reducing transmission times. The truncated reply still includes the CRC-16 as calculated over the entire ID, and the reader must prepend the known leading bits to the actually-transmitted bits in order to validate the transmission.

Thus there exists a need to reduce the amount of bits transmitted by tags during RFID communications while still maintaining compatibility with RFID communications standards.

BRIEF SUMMARY OF THE INVENTION

Methods, systems, and apparatuses for RFID tags, RFID readers, communications algorithms, and RFID-related applications are described herein.

In an aspect of the invention, an RFID tag is capable of storing data, receiving a signal from a reader, determining a response taking into account the tag mode and the data, and transmitting a response to the reader. The data includes a first plurality of bits and a second plurality of bits. The tag mode may be set by a current or a prior command by the reader. Depending on the tag mode, the response may be complete (i.e., an unaltered response), or the second plurality of bits may be altered, such as truncated, compressed, or encrypted. In an aspect of the invention, the response includes an implicit indication of whether the response is complete or altered. In another aspect of the invention, a command from the reader indicates how many bits should be altered.

In an aspect of the invention, the reader is capable of explicit commands to change tag mode, and the tag is capable of complying with the explicit commands. In another aspect of the invention, the reader is capable of implicit commands to change tag mode, and the tag is capable of complying with the implicit commands.

In an aspect of the invention, the tag is capable of providing the complete or altered (e.g., truncated, compressed, or encrypted) responses to reader commands until it receives a signal having a command to change to another mode. In an aspect of the invention, the tag is capable of changing to another mode without any command to do so, such as in an implicit fashion.

In an aspect of the invention, the tag passes compliance testing for a tag data standard. In another aspect of the invention, the reader passes compliance testing for a tag data standard.

In another aspect of the invention, the tags contain logic which calculates the truncation, compression, or encryption as appropriate. In another aspect of the invention, these tags contain storage to store the altered response(s).

In an aspect of the invention, a method is used by the tags to examine a received signal, determine whether to change tag mode, examine the stored data comprising a first and second pluralities of bits, and assemble a response based on the mode and the stored data. The response may be complete or altered depending on the tag mode.

In an aspect of the invention, the method includes responding to an implicit command to change mode from the reader. In another aspect, the tag responds to an explicit command to change mode from the reader. In an aspect of the invention, the command (explicit or implicit) includes an indication of how many bits are altered in the tag response. In an aspect of the invention, the tag passes compliance testing for a tag data specification.

In an aspect of the invention, a method is used by an RFID reader to communicate with a tag population. The method includes determining whether to set a tag mode with a command, assembling and transmitting the command signal, and receiving a response from the tag. In an aspect of the invention, the reader may send a command to tags to enter an alter mode, such as a compress, truncate, or normal mode.

In an aspect of the invention, an application-layer module has an interface which couples the module to the reader. The interface receives tag responses from the reader, and analyzes the response to determine the tag mode. In an aspect of the invention, the tag mode is deemed normal for a tag which does not support the modes described herein.

In an aspect of the invention, the application layer module analyzes a tag response with an explicit indication of tag mode. In another aspect of the invention, the application layer module analyzes a tag response with an implicit indication of tag mode. In an aspect of the invention, the application layer module completes at least a portion of the altered tag response.

These and other objects, advantages and features will become readily apparent in view of the following detailed description of the invention. Note that the Summary and Abstract sections may set forth one or more, but not all exemplary embodiments of the present invention as contemplated by the inventor(s).

BRIEF DESCRIPTION OF THE DRAWINGS/FIGURES

The accompanying drawings, which are incorporated herein and form a part of the specification, illustrate the present invention and, together with the description, further serve to explain the principles of the invention and to enable a person skilled in the pertinent art to make and use the invention.

Figure 1:
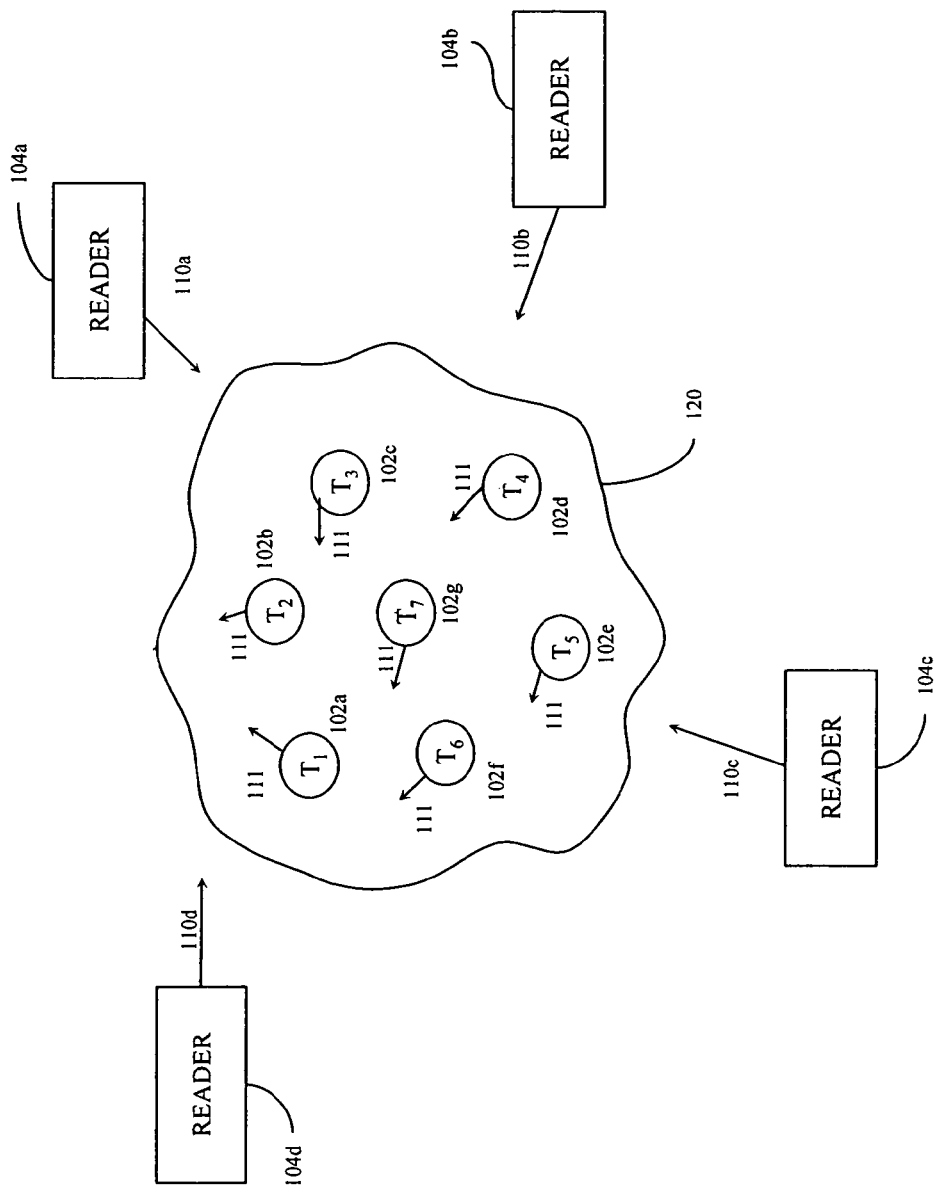
FIGS. 1-2 show exemplary environments where RFID readers communicate with a population of tags.

The present invention will now be described with reference to the accompanying drawings. In the drawings, like reference numbers indicate identical or functionally similar elements. Additionally, the left-most digit(s) of a reference number identifies the drawing in which the reference number first appears.

DETAILED DESCRIPTION OF THE INVENTION

Introduction

Methods, systems, and apparatuses for RFID tags and readers are described herein. In particular, methods, systems, and apparatuses for altered tag responses, such as truncated, compressed, or encrypted tag responses, are described. According to embodiments of the present invention, readers are capable of sending, and tags are capable of complying with, explicit and/or implicit commands to alter the trailing characters in the tag response.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

The features and benefits of this invention are applicable to any RFID system. However, some of the exemplary embodiments are described in the context of the EPC Generation 2 (Gen 2) specification. These descriptions are intended to aid a person skilled in the art in understanding aspects of the invention and do not limit the invention. In the Gen 2 specification example, some embodiments are described that use an explicit extension (a newly-defined command), and other embodiments use an implicit extension (no new command). In both cases, at least the following three general problems are solved:

(1) How the reader will command a tag to alter its transmission (e.g., to encrypt, compress and/or truncate its trailing bits) when responding.

(2) How the tag will convey an altered (e.g., encrypted, compressed and/or truncated) version of the tag ID (and/or any other data payload) to the reader in an unambiguous way.

(3) How the encrypted, compressed and/or truncated ID (and/or any other data payload) will be presented to the receiving application-layer software.

Other embodiments may use both implicit and explicit commands. Embodiments of the invention implemented in the context of other current or future data specifications may also use either implicit, explicit, or both types of commands.

Example RFID System Embodiment

Before describing embodiments of the present invention in detail, it is helpful to describe an example RFID communications environment in which the invention may be implemented. FIG. 1 illustrates an environment 100 where RFID tag readers 104 communicate with an exemplary population 120 of RFID tags 102. As shown in FIG. 1, the population 120 of tags includes seven tags 102a-102g. A population 120 may include any number of tags 102.

Environment 100 includes any number of one or more readers 104.

For example, environment 100 includes a first reader 104a and a second reader 104b. Readers 104a and/or 104b may be requested by an external application to address the population of tags 120. Alternatively, reader 104a and/or reader 104b may have internal logic that initiates communication, or may have a trigger mechanism that an operator of a reader 104 uses to initiate communication. Readers 104a and 104b may also communicate with each other in a reader network.

As shown in FIG. 1, reader 104a transmits an interrogation signal 110a having a carrier frequency to the population of tags 120. Reader 104b transmits an interrogation signal 110b having a carrier frequency to the population of tags 120. Readers 104a and 104b typically operate in one or more of the frequency bands allotted for this type of RF communication. For example, frequency bands of 902-928 MHz and 2400-2483.5 MHz have been defined for certain RFID applications by the Federal Communication Commission (FCC).

Various types of tags 102 may be present in tag population 120 that transmit one or more response signals 111 to an interrogating reader 104, including by alternatively reflecting and absorbing portions of signal 110 according to a time-based pattern or frequency. This technique for alternatively absorbing and reflecting signal 110 is referred to herein as backscatter modulation. Readers 104a and 104b receive and obtain data from response signals 111, such as an identification number of the responding tag 102. In the embodiments described herein, a reader may be capable of communicating with tags 102 according to any suitable communication protocol, including Class 0, Class 1, EPC Gen 2, other binary traversal protocols and slotted aloha protocols, any other protocols mentioned elsewhere herein, and future communication protocols.

Figure 2:
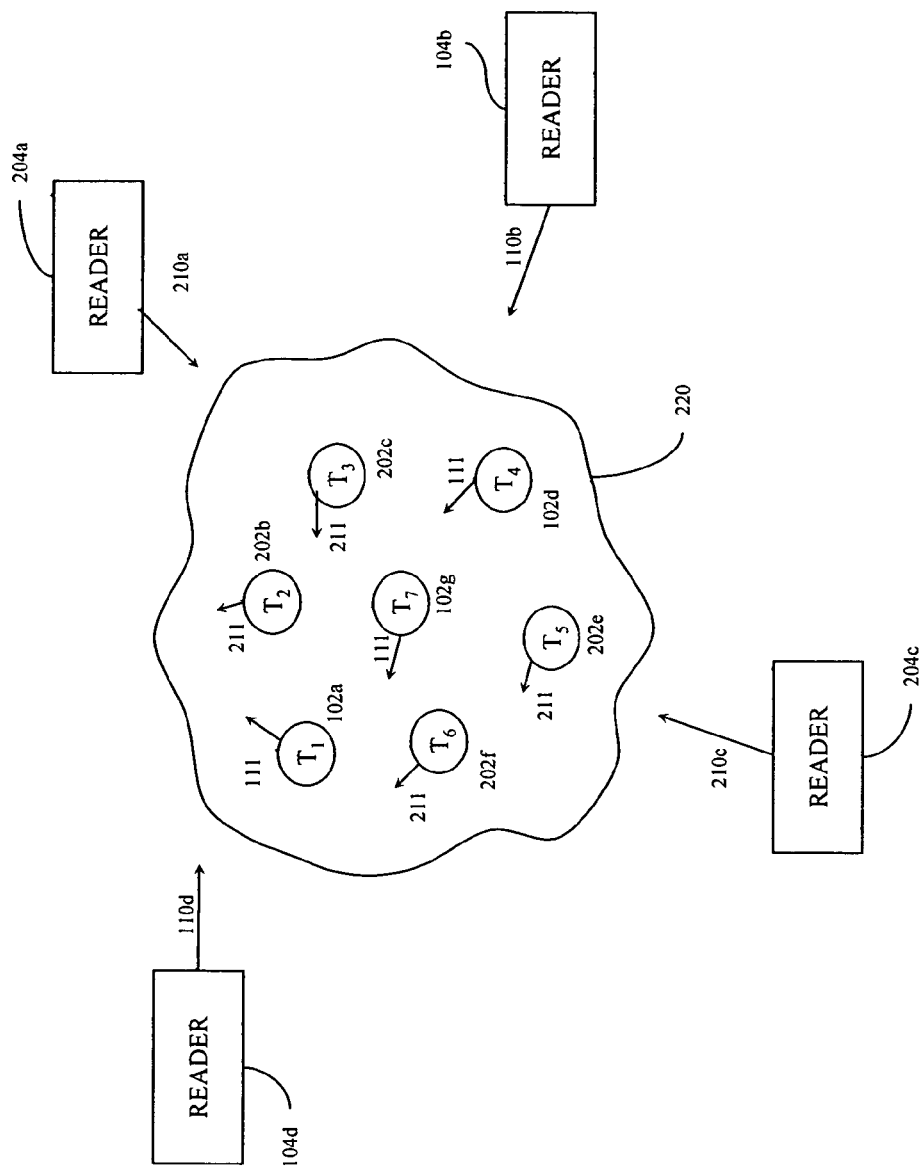

In an embodiment, tag population 120 is not composed of identical tags 102. For example, FIG. 2 shows an environment 200 with a population 220 of tags 102 and tags 202. Tags 202b, 202c, 202e, and 202f are enhanced tags. The other tags, 102a, 102g, and 102d are non-enhanced tags.

Furthermore, FIG. 2 shows enhanced readers 204a and 204c and non-enhanced readers 104b and 104d. Enhanced readers 204 are configured to take advantage of the features of the enhanced tags 202, yet also interoperate with the non-enhanced tags 102. In an embodiment, non-enhanced readers 104 communicate seamlessly with both enhanced tags 202 and non-enhanced tags 102, but are unable to take advantage of the enhanced features of enhanced tags 202.

In an embodiment, a reader 204 sends a signal 210 which is received by tags of population 220. Signal 210 includes a command to tags 202 to alter the trailing digits, such as a command to truncate, compress, and/or encrypt the trailing digits. A response 111 from a non-enhanced tag 102 will not have any characters altered. Reader 204 will accept response 111 and process it appropriately. A response 211 from an enhanced tag 202 will have altered trailing characters, which reader 204 will accept and process appropriately. In embodiments, the command may be implicit or explicit. In an embodiment, the alter command includes an indication of the number of trailing characters to alter.

For example, if signal 210 includes a truncate command, a response from an enhanced tag 202 will have truncated trailing characters as appropriate based on the command, and reader 204 will receive and process the response accordingly. Likewise, for compress or encrypt commands, the response 111 from a non-enhanced tag 102 will not be compressed or encrypted, and reader 204 will accept response 111 and process it appropriately. A response 211 from an enhanced tag 202 will have either compressed or encrypted trailing characters as appropriate based on the command. Reader 204 will receive and process the response appropriately. For alter commands, such as truncate, compress, and encrypt commands, embodiments allow for implicit and explicit commands. In embodiments, the commands include an indication of the number of trailing characters to be altered.

In embodiments, reader 204 may send signal 210 to command tag 202 to generate a response 211 with compressed, truncated, or encrypted trailing characters, or with the normal or full amount of data. Other signals 210 may command tag 202 to enter and remain in a compressed, truncate, encrypted, or normal mode, until commanded to change mode. Other signals 210 may command tag to both respond and remain in the commanded mode.

In an embodiment, signal 210 may contain an explicit command to tag 202. In another embodiment, a command may be implicit. Implicit commands use existing commands, command parameters, and or tag states in an existing communication protocol to generate enhanced commands to enhanced tags 202. Explicit commands are new commands introduced to an existing or planned protocol. For the sake of clarity, the term "command" is used to signify both or either implicit and explicit commands, unless otherwise indicated.

Example RFID Tag Embodiments

Figure 3A:
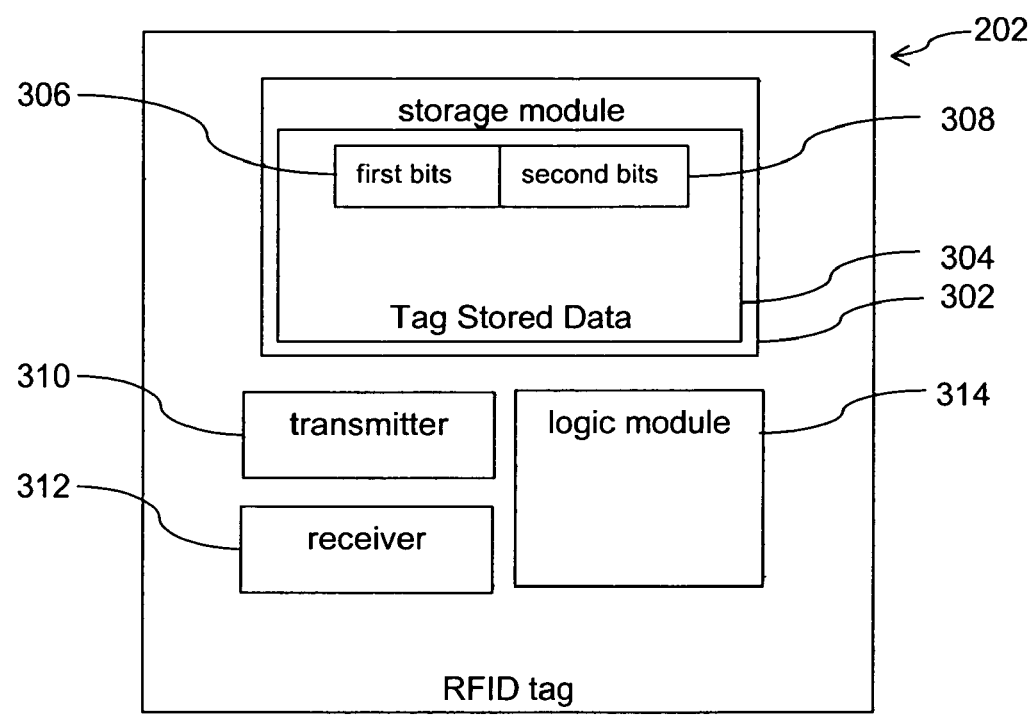
FIGS. 3A-3C show block diagrams of an RFID tag, according to exemplary embodiments of the present invention.

FIG. 3A shows an example embodiment of an enhanced tag 202. As shown in FIG. 3A, tag 202 includes a storage module 302, a transmitter 310, a receiver 312, and a logic module 314. Receiver 312 receives signals 110 from in range readers 104 and signals 210 from in range readers 204. Storage module 302 stores data 304, which includes a first plurality of bits 306 and a second plurality of bits 308. Storage module 302 may store information (e.g., data and instructions) beyond data 304. Logic module 314 determines a response 211 to a received signal 210 or 110. Transmitter 310 transmits the response 211.

Figure 3B:
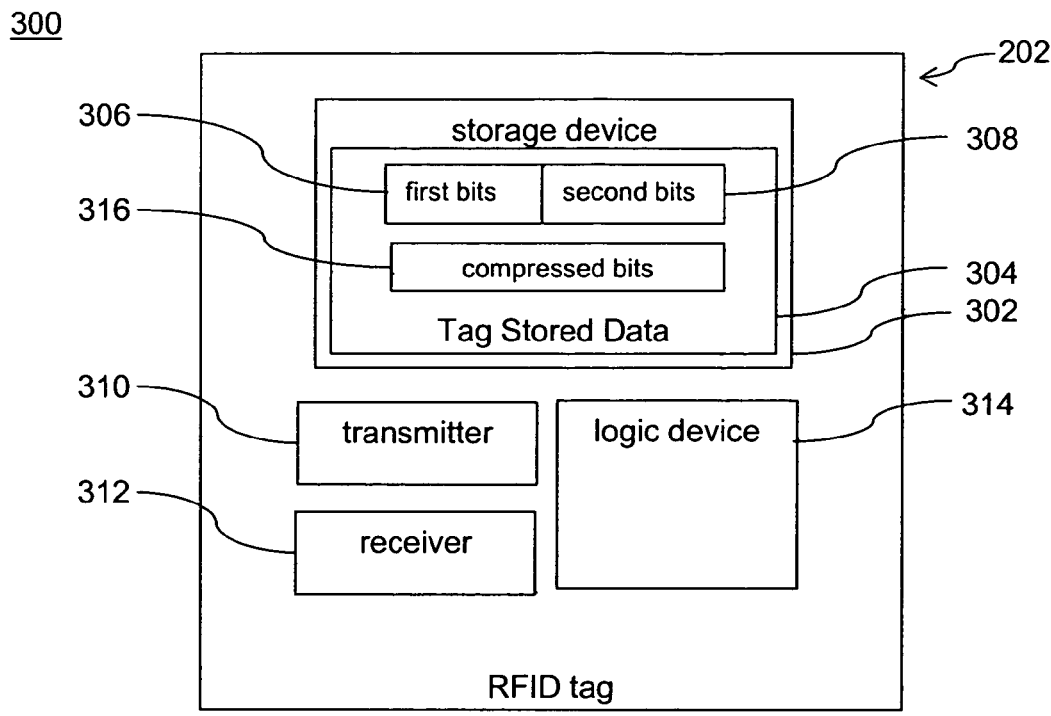
Figure 3C:
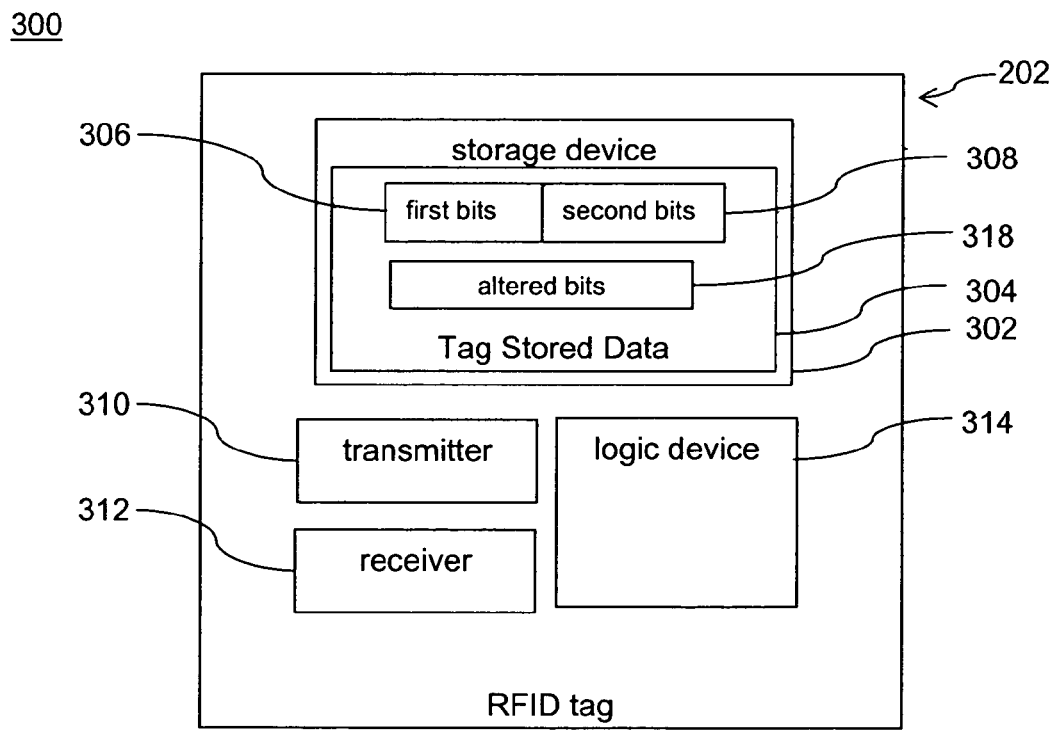

FIGS. 3B and 3C show further embodiments of tag 202, similar to the embodiments of tag 202 shown in FIG. 3A. As illustrated in FIG. 3B, in an embodiment, data 304 may include a compressed plurality of bits 316, which is a compressed version of second plurality of bits 308. As illustrated in FIG. 3C, data 304 may include an altered plurality of bits 318, which is an altered version of second plurality of bits 308. In embodiments, data 304 may also include both compressed plurality of bits 316 and altered plurality of bits 318. Data 304 may contain other information (e.g., data and instructions) beyond what is described herein.

In an embodiment, tag 202 may be in one of several modes. Example modes include normal, trailing compress, trailing truncate, and trailing encrypt. Signals 210 may command tag 202 to enter one of the various modes for only one response 211 or for all further responses 211 until signal 210 contains a command to change mode again. If tag 202 is in normal mode, response 211 will include both first plurality of bits 306 and second plurality of bits 308. If tag 202 is in trailing truncate mode, response 211 will include first plurality of bits 306 and none of the second plurality of bits. If tag 202 is in trailing compress or trailing encrypt mode, response 211 will include the first plurality of bits 306 and an altered (e.g. compressed or encrypted) second plurality of bits. In embodiments, the altered second plurality of bits in response 211 may be read from storage module 202 (e.g., compressed plurality of bits 316 or altered plurality of bits 318 of FIG. 3C). In other embodiments, the altered second plurality of bits in response 211 may be calculated on demand by logic 314 from the second plurality of bits 308.

Deciding whether to implement an embodiment capable of reading and/or calculating a response 211 is an engineering trade-off between tag 202 storage capacity and logic capability. In some tag 202 implementations, tag storage will be at a premium, and it may be best to store compressed data on the tag 202, at the cost of additional processing required to transmit the standard (i.e., expanded) version of the data. In other tag 202 implementations, however, there may already be sufficient storage available for the chosen data structure, and it may be more cost-effective to keep logic module 314 in the tag as simple as possible by encoding both the compressed and the uncompressed versions of the data and storing in tag storage module 302 when the tag is programmed.

An additional advantage of this second approach is that the compaction/expansion processing capability can be resident in reader 204, not in the tag 202. Thus improved compaction methods can be defined and implemented without changing the implemented tag 202. Also, a compromise approach can be implemented: a tag 202 could be programmed with both a lightly-compressed version of the data (e.g., only implementing run-length encoding of padding bits), and a fully-compressed version of the data (e.g., multi-base compaction of the remaining non-padding data). In this scenario, logic in tag 202 may include the capability to expand the padding, but would not necessarily include the ability to decompress the fully-compressed data. This compromise can be useful, and may allow freeing up enough room in tag storage module 302 to support two versions of the data on the same tag 202.

In an embodiment, the number of bits in the second plurality of bits 308 may be set in a command of signal 210. In an embodiment, the number of bits total between the first plurality of bits 306 plus the second plurality of bits 308 is a constant number, thus a signal 210 which commands a certain number of bits in the second plurality of bits 308 is also a command for a corresponding number of bits in the first plurality of bits 306. Thus, in an embodiment, a signal 210 not only may put tag 204 into a mode (e.g., truncate, compress, or encrypt), but also may command the tag how many trailing bits to truncate, compress, or encrypt.

Example RFID Reader Embodiments

Figure 4A:
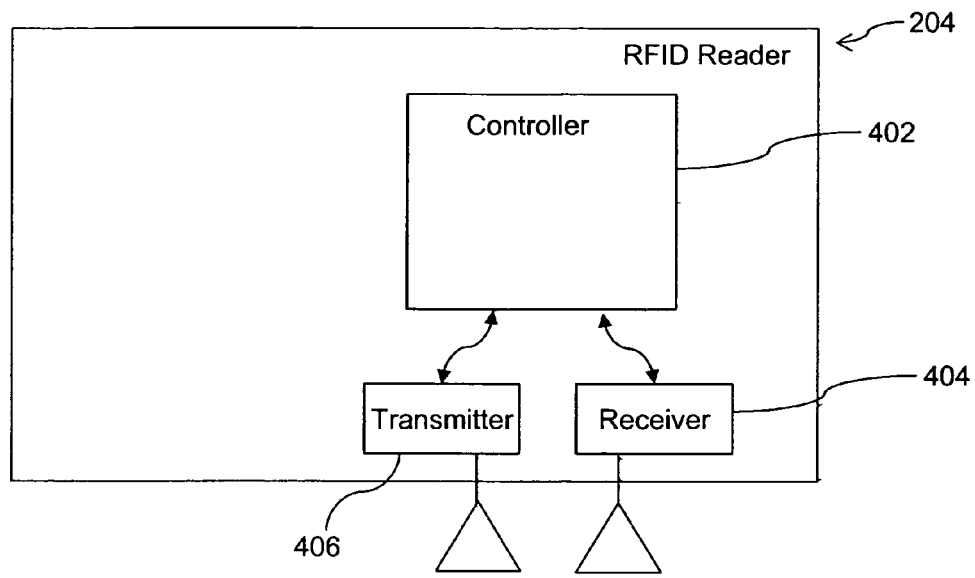
FIGS. 4A-4B show block diagrams of an RFID reader, according to exemplary embodiments of the present invention.

Embodiments incorporating reader 204 are applicable to existing and future applications using RFID tags and readers. FIG. 4A shows an example embodiment of an enhanced reader 204. The enhanced reader includes a controller 402, a transmitter 406, and a receiver 404. Reader 204 communicates with tags in a tag population 220 by transmitting signals 210 via transmitter 406 and receiving tag responses 211 via receiver 404. Controller 402 accepts user inputs via a local user interface (not shown) or via a network (not shown). Controller 402 also outputs tag data to a user via the user interface (not shown) or via a network (not shown). Controller 402 may also communicate with a larger system via a network (not shown). Controller 402 may be implemented in hardware, software, firmware, or any combination thereof.

In an embodiment, reader 204 accepts the user and/or system inputs and controller 402 determines a content for signal 210 based on the user or system input and the context of the situation. Reader 204 transmits signal 210 to the tag population 220. Reader 204 receives responses 211 from any enhanced tags 202 and responses 111 from any non-enhanced tags 102 in tag population 220. Controller 402 processes response 111 and/or 211 and may output tag data to the user or to a larger system.

Figure 4B:
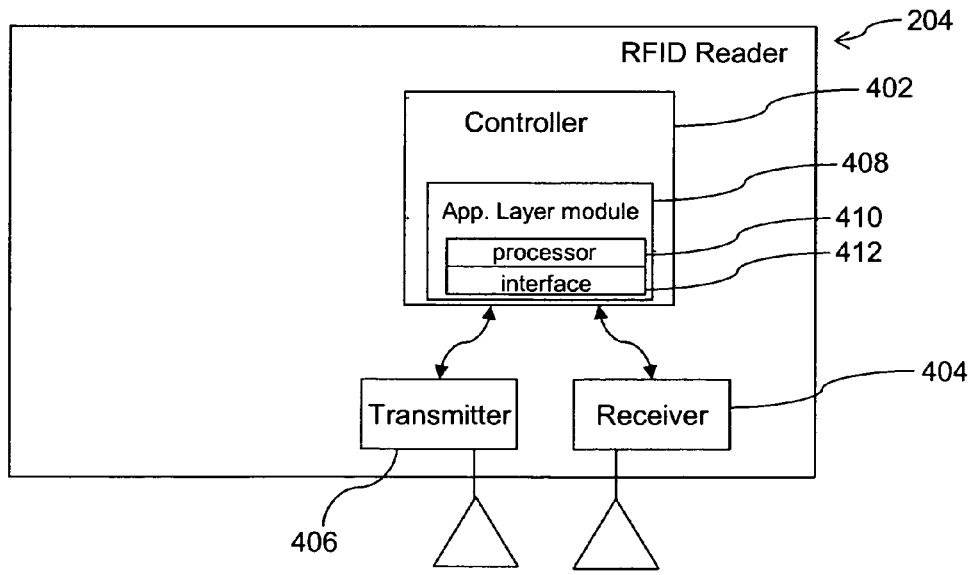

In an embodiment, controller 402 includes an application-layer module 408, as shown in FIG. 4B. In an embodiment, Application layer module 408 functions to insulate application software from the details of any truncation, compression, or encryption which may be occurring. Application-layer module 408 includes an interface 412 and a processor 410. Application-layer module 408 receives tag response data at interface 412 from reader 204. Interface 412 accepts tag data and formats it for processor 410. Processor 410 analyzes tag data and determines the mode of the sending tag 202. Processor 410 processes the data to insulate application software. Application layer module 408 is further described below.

Example RFID Reader and Tag Embodiment Methods

Figure 5:
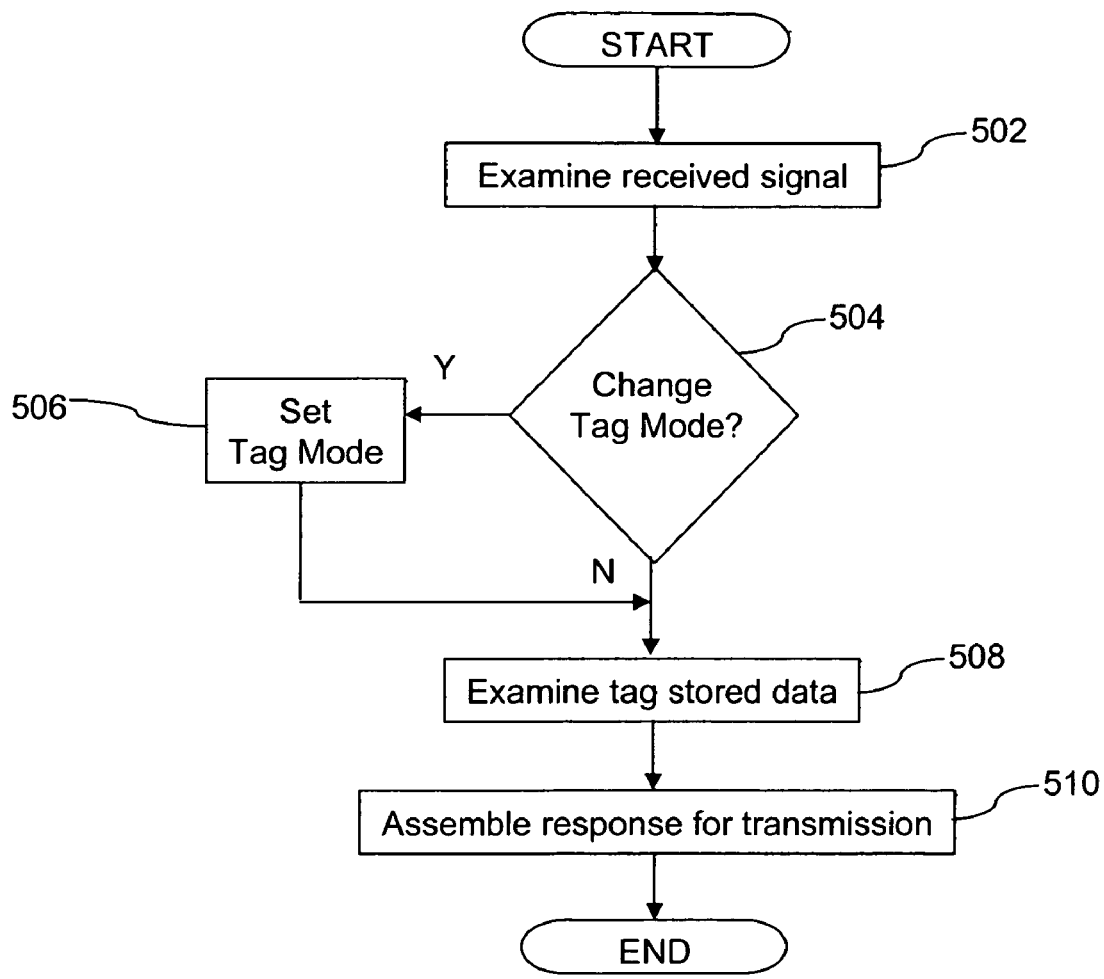
FIG. 5 shows a flowchart for a RFID tag to examine a received reader signal, and assemble a response, according to exemplary embodiments of the present invention.
Figure 6:
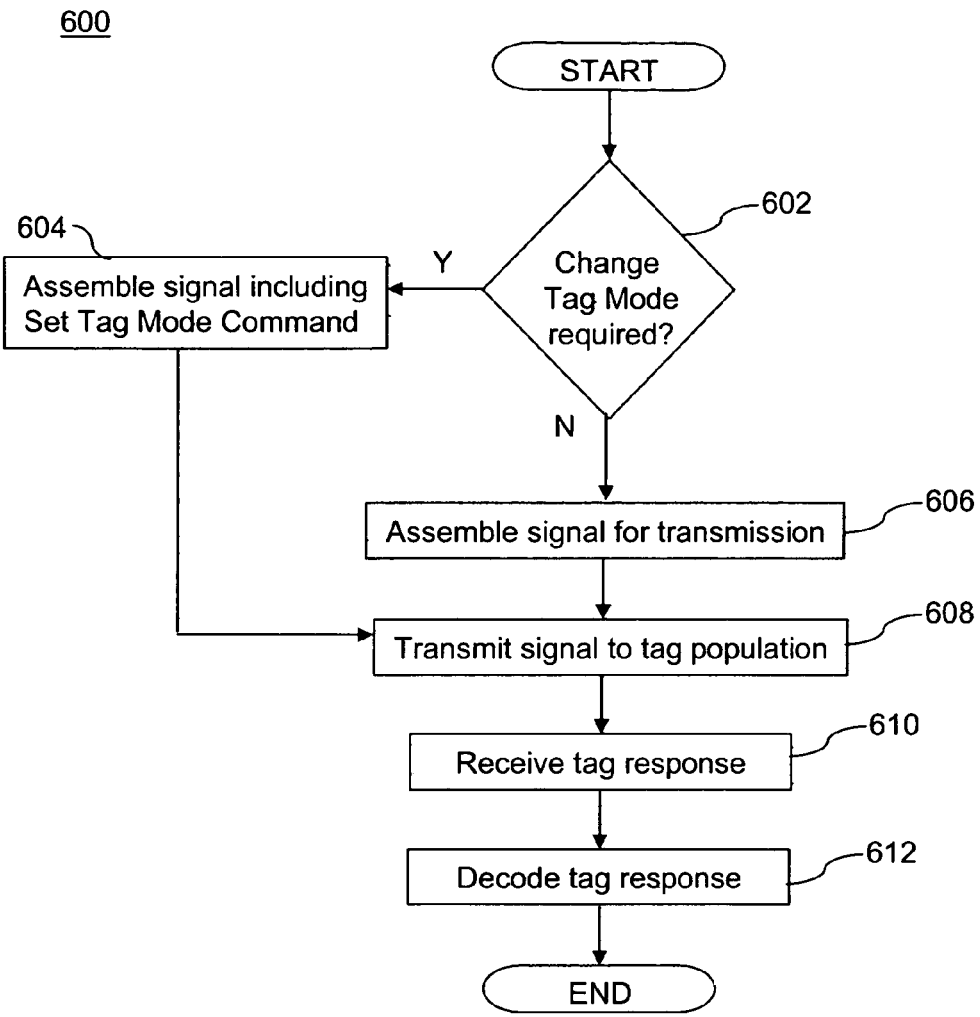
FIG. 6 shows a flowchart for a RFID reader to assemble and transmit a signal to a RFID tag population, according to exemplary embodiments of the present invention.

The operation of reader 204 and tag 202 together is illustrated in FIGS. 5 and 6. FIG. 5 shows a flowchart 500 for a tag such as tag 202, according to an embodiment. Flowchart 500 is described as follows:

In step 502, a tag examines a received signal. For example, as shown in FIG. 2, tag 202 may receive a signal 210 from a reader 204.

In step 504, the tag interprets the signal and determines whether a change in mode has been commanded. In an embodiment, signal 210 may include an explicit command. In another embodiment, signal 210 may include an implicit command. If the tag determines that a change of mode has been commanded, then flowchart 500 proceeds to step 506. If the tag determines that no change of mode has been commanded, then flowchart 500 proceeds to step 508.

In step 506, the tag sets the appropriate tag mode. Operation then proceeds to step 508. For example, the mode may be Trailing Truncate Mode (TTM), Trailing Compress Mode (TCM), Trailing Encrypt Mode (TEM), or other mode.

In step 508, the tag examines at least some tag data. For example, the tag data may be data 304.

In step 510, the tag assembles a response for transmission based on the current tag mode and contents of at least some tag data.

In an embodiment, the tag mode is TTM. In such an embodiment, the response is a response 211, which includes a first plurality of bits 306 and does not include a second plurality of bits 308. In an embodiment, the current or a previous command determined the number of bits to be truncated, i.e. determined how many bits are in the first plurality of bits 306 and how many were in the second plurality of bits 308.

In another embodiment, the tag mode is TCM. In such an embodiment, the response is a response 211 as assembled in step 510, and includes a first plurality of bits 306 and a compressed version of a second plurality of bits 308. In an embodiment, the compressed version of the second plurality of bits are calculated on demand by tag logic module 314. In another embodiment, a compressed version of the second plurality of bits 316 are stored in the tag storage module 302, and are assembled into response 211. In an embodiment, response 211 also includes an indication of the current tag mode. In yet another embodiment, the tag mode is Trailing Encrypt Mode (TEM), which is similar to TCM, except the second plurality of bits are encrypted instead of compressed.

FIG. 6 shows a flowchart 600 for a reader, such as reader 204 according to an example embodiment.

In step 602, a reader determines whether a change tag mode command is to be issued. This decision may be based on internal or external processing, or by operator input. If a change tag mode command is to be issued, operation proceeds to step 604. If a change tag mode command is not required, operation proceeds to step 606.

In step 604, the contents of a signal having a set tag mode command are assembled for transmission. In an embodiment, the signal is a signal 211 and the command is an explicit command. In another embodiment, the signal is a signal 211 and the command is an implicit command. Whether explicit or implicit, the command may be configured to change mode to normal, TTM, TEM, or TCM, or may be any other command. After step 604, operation proceeds to step 606.

In step 606, the contents of a signal without a set tag mode command are assembled for transmission.

In step 608, regardless whether the signal was assembled in step 604 or 606, the signal is transmitted to a tag population.

In step 610, at least one tag in the tag population receives the signal and transmits a response. Reader 204 receives at least one response.

In step 612, reader 204 decodes the at least one response. In an embodiment, an application layer module 408 formats the response data for internal reader 204 applications and other external applications.

Example RFID Reader and Tag Embodiments Illustrated in an Existing Data Specification The following embodiments are provided to illustrate embodiments of the invention and are not intended to be limiting. The general principles described are common to operation with any tag data specification, including EPC Generation 2 (Gen 2), and apply to other embodiments which operate in the context of other existing and future tag data specifications or protocols.

For example, in an embodiment, changes to the existing EPC Generation 2 (Gen 2) specification are minimized. In this example, tag 202 does not enter an alternate protocol sequence to send shortened data. Thus, it enters a new tag mode instead of requiring a new Protocol State. When in Trailing-Truncation Mode (TTM), tag 202 communicates as a non-enhanced tag 102 or enhanced tag 202 in normal mode, except that when sending its EPC ID, it will truncate a trailing portion of its ID data. In other words, tag 202 in TTM will respond with the serialized portion of its PC/EPC/CRC-16 replies truncated. A tag 202 in Trailing Compression Mode (TCM) likewise responds with the serialized portion of its reply compressed, or if in Trailing Encryption Mode (TEM), with the serialized portion of its reply encrypted.

Reader 204 may command tag 202 to enter TTM, TCM, TEM or normal mode through either an explicit command extension or an implicit command. In the Gen 2 specification, newly-defined explicit commands may be from one of four categories: Mandatory, Optional, Proprietary, or Custom. "Optional" commands are useful for explicitly extending the Gen 2 protocol in this example for the following reasons:

(1) If implemented as Mandatory commands, then existing Gen 2 tags and readers may be rendered obsolete.

(2) If implemented as Proprietary commands, then the new command may be in violation of the specification. The EPCglobal Specification for RFID Air Interface: EPC Radio Frequency Identity Protocols Class-1 Generation 2 UHF RFID Conformance Requirements, version 1.0.2, February, 2005 (Gen 2 specification) Section 2.3.3 states "[p]roprietary commands are intended for manufacturing purposes and shall not be used in field-deployed RFID systems."

(3) If implemented as Custom commands, then a benefit is negated by the necessity to obtain additional information from the tag. The Gen 2 specification section 2.3.4 states "[a]n Interrogator shall issue a custom command only after singulating a Tag and reading (or having prior knowledge of) the Tag manufacturer's identification in the Tag's TID memory. An Interrogator shall use a custom command only in accordance with the specifications of the Tag manufacturer identified in the TID."

Therefore, in an example embodiment, the Gen 2 specification is extended with explicit Optional commands. The current EPC Gen 2 protocol has many to-be-defined command bit patterns (such as the entire range from 11001001 through 11011111 inclusive). The following considerations affect the definition of the new commands:

(1) As mentioned above, the new commands may be declared as Optional, so that extant tags and readers are not rendered obsolete. A mix of enhanced tags 202 and non-enhanced tags 102 may then coexist, because a mix of truncated (or compressed or encrypted) and full replies can be reliably discriminated and correctly handled by both reader 204 and non-enhanced reader 104. Non-enhanced reader 104 can accept tag 202's truncated reply (in TTM) because it is in an already-defined Gen 2 format, as will be described below. When using enhanced readers 204, the negative impact of mixing non-enhanced tags 102 in with enhanced tags 202 is that a given percentage of old tags will result in that same percentage of "long" replies rather than optimized non-serialized replies. This proportionally reduces the overall throughput and/or data security.

(2) There is no catastrophic effect if one or more tags 202 fail to properly receive the mode-change command—these tags 202 may simply respond with full replies rather than optimized (or encrypted) replies. This is to ensure that there is no need for the reader 204 to confirm that all tags 202 received the command, nor a need to query tags for their current mode.

(3) The tags 202 may be put into the TTM (or TEM, TCM or any other) mode before replying with PC/EPC/CRC-16. Since even the first Query command of a new inventory round may cause a tag 202 to reply immediately, it is advantageous to execute the mode change as a Select operation rather than as an Inventory or Access operation.

(4) Currently, the Gen 2 specification only defines one Select Operation (the Select command, bit pattern 1010). Since pattern 1011 is currently reserved, it is a natural choice for an alternate, optional version of the Select command, with a definition identical to the existing Select command, except that it also puts tags into a new mode of operation. By extending the command one bit, two alternative commands 10110 and 10111 are created, which correspond to commands to enter TTM and TCM. Note that, in this embodiment, a series of 1011X commands act the same as a series of standard Select commands, allowing the same union, intersection, and negation of selection criteria. Additional commands may be implemented by using the mask bits, by extending to include one or more additional bits, or by the use of the implicit command techniques described herein in combination with the explicit command.

(5) In an embodiment, tag 202 stays in TTM, until it powers down or until a standard Select command (starting with 1010) is received. In other words, a standard Select command orders tag 202 to normal mode.

However, this example explicit command may result in non-serialized tag IDs that may be incompatible with existing or proposed database structures. Thus another embodiment using implicit commands while supporting open system use does not require any changes to the Gen 2 specification.

An implicit command is a variant of an existing command, or particular sequence of existing commands, that non-enhanced tags 102 may either safely perform or ignore, but that enhanced tags 202 can interpret as a command to change tag mode. For an implicit command, the above considerations except (4) apply. Also, an additional consideration applies: the result should conform to existing standards to the extent that standard compliance and interoperability testing would fail to detect the extension. Enhancements that are not detectable by compliance testing are desirable because compliance testing provides a level of assurance that enhancements are fully compliant with all non-enhanced tags 102 and readers 104. A non-compliant embodiment of enhanced tag 202 or reader 204 might not be as useful in some situations as a fully compliant tag 202 or reader 204. This is not mandatory but should be considered when deciding upon implementation details for a particular application.

In an embodiment, enhanced tag 202 and enhanced reader 204 may not pass compliance testing. For example, in an embodiment, a variant of the Gen 2 Select command is defined by using a parameter value that is currently reserved for future use (such as a "Target" of "111" or a MemBank of "00"). This approach may or may not be acceptable to the standards community, and could be detected through compliance testing.

In another embodiment, tag 202 and reader 204 will pass compliance testing. A variant of Select uses a combination of Length and Mask parameters that deliberately references a memory location that does not exist on non-enhanced tag 102 or enhanced tag 202, i.e. use a pointer parameter that is bigger than the memory space of any existing or anticipated tag. Enhanced tag 202 (as well as non-enhanced tag 102) complies with the Gen 2 specification by considering the Select to be non-matching. The Gen 2 specification does not prohibit commands that reference non-existent memory, so enhanced reader 204 is not non-conforming for issuing such a command.

This command, with an Action of "001" (do nothing on non-matching Selects), would induce no response on non-enhanced tag 102. It would have no directly testable effect on enhanced tag 202. However, it would put enhanced tag 202 into TTM. To further minimize the chance of tag 202 from receiving an errant implicit change mode command, a specific Mask pattern may also be defined. In an embodiment compliant with the Gen 2 specification, tag 202 ignores the command unless it includes this specific Mask pattern. In Gen 2, this Mask pattern can be as long as 256 bits, thus minimizing the possibility of an accidental TTM (or TEM, TCM or any other) command. In an embodiment, the Mask pattern also includes an indication of the number of trailing bits to truncate, compress or encrypt.

In an embodiment compliant with the Gen 2 specification, tag 202 remains in TTM, TEM, or TCM mode after receiving the respective implicit command. Standard Select commands (supporting the normal union, intersection, and negation of selection criteria) do not place the tag into normal mode. An additional command is required to take tag 202 out of TTM, TEM, TCM or other mode and into normal mode. In an embodiment, the same implicit command (for TTM, TEM, or TCM) but with the 1's complement of the specific Mask pattern places tag 202 in normal mode. In another embodiment, the 1's complement Mask pattern represents a command to another mode altogether.

In another embodiment compliant with the Gen 2 specification, the implicit command is a "nonsensical" sequence of one or more Select commands. For example, the Gen 2 specification defines a Mask length of 0 to mean that all tags are considered matching; sending such a command with an action of "do nothing on a match" would not make sense. Another example would be to send a pair of Select commands in sequence, first with truncation enabled and then with it disabled. It is reasonably certain that such a sequence of commands exhibiting both features, repeated several times, would be an extremely unlikely occurrence from a non-extended reader, and thus could be used to command TTM (or TCM, TEM, normal, or any other mode) in tag 202. In an embodiment, no subsequent command is required to put tag 202 back in normal mode. In an embodiment, these commands use a "nonsensical" sequence of commands with a MemBank of "01" as the command to enter TTM (or TCM or TEM), and that same sequence using MemBank "10" commands tag 202 to go to normal mode. In another embodiment, altering the MemBank command parameter commands tag 104 to transition to another mode altogether.

In an embodiment, where tag 204 is compliant with the Gen 2 specification, once tag 204 is in TTM, TEM, or TCM (or any other mode), it is able to convey a trailing truncated or compressed version of the tag ID to reader 204 in an unambiguous way. In an embodiment, a new Header type is used to indicate whether the reply is compressed, truncated, or otherwise altered. Enhanced readers 204 can interpret the new header, but non-enhanced readers 104 would reject as an unsupported header type.

In another embodiment, the "Length Bits" field in the Gen 2 Tag Data Standard can be used to convey the length of the shortened tag ID. In Gen 2 Tags, the actual number of bits in the ID is still determined from the Header. The Header indicates the format of the ID, e.g. sGTIN-96, GRAI-170. Gen 2 tags have an additional Length Bits field to indicate how many 16-bit words of the Tag's ID memory are actually filled with valid bits. For a completely-encoded tag encoding an EPC-global-defined data structure such as an sGTIN, this is merely redundant information. However, if the Length Bits indicate fewer valid words than are necessary to complete the data structure named in the header, then this implies a partially-encoded tag (such as a tag programmed in multiple stages, where perhaps the serialization portion has not yet been added). The Gen 2 specification defines the Length Bits field, but does not mention any application or use of a partially-encoded tag. In an embodiment, the Length Bits field is used to emulate the transmitted sGTIN-96 from an incomplete tag, even though tag 202 is in fact completely encoded. Thus non-enhanced readers 104 can read and handle the tag data as it does for an incomplete tag. In an embodiment, enhanced readers 204 will handle the tag as an incomplete tag, unless reader 204 is expecting a truncated or compressed response based on a previous command.

Figure 7A:
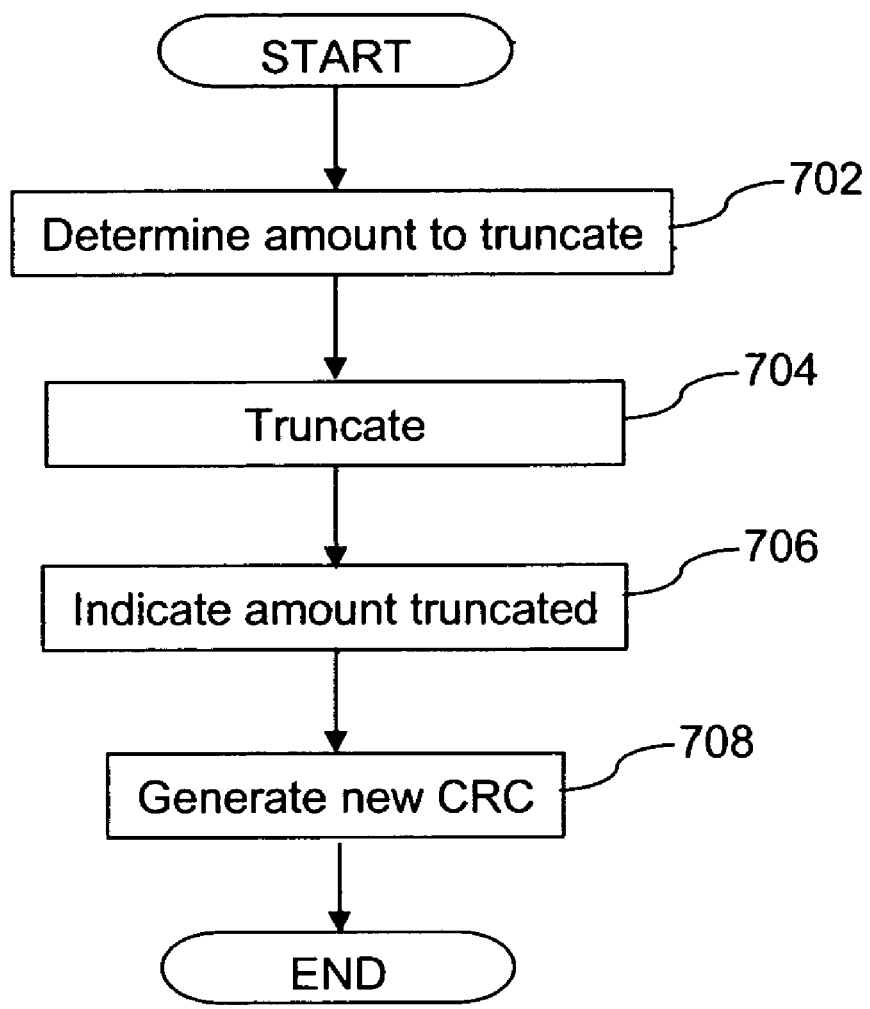
FIGS. 7A-7B show flowcharts for an RFID tag (in two example modes) to assemble a response, according to exemplary embodiments of the present invention.

In an embodiment, a tag 202 in TTM modifies its responses to indicate to reader 204 that the reply is truncated. For example, FIG. 7A shows a flowchart 700 illustrating an embodiment of tag 202 in TTM, using the Gen 2 data specification, assembling a response to a valid "ACK[RN16] command from reader 204, illustrating the deviation from the standard, or normal mode, "PC/EPC/CRC-16" reply.

Flowchart 700 begins with step 702. In step 702, a tag determines an amount to truncate. In an embodiment, tag 202 in TTM mode truncates a specified number of trailing bits depending on the format of the tag data. For example, the serialized data may be truncated; thus, if the tag ID is SGTIN-96, tag 204 may lookup based on the ID type as indicated in the Header, and truncated to a length of 4 words instead of 6. In another embodiment, reader 204 commands tag 202 to TTM with a specified truncation length. Tag 202 has thus been told what the Length Bits field value will need to be.

In step 704, the tag truncates the response. Since the Length Bits define a length in 16-bit words, the last word may include a few of the initial bits of the serial number that is now being truncated. Although these leftover bits can be unambiguously parsed-away by the application, in an embodiment, tag 202 replaces these leftover bits with all-zero bits when transmitting to better emulate the output from a partially-programmed tag. In another embodiment, these bits are left alone.

In step 706, the tag indicates the amount truncated. In an embodiment, instead of transmitting the actual Length Bits of the un-truncated data, Tag 202 will transmit a new Length Bits value reflecting the post-truncation length. In another embodiment, the Header value is modified to explicitly indicated truncation and the amount truncated.

In step 708, the tag generates a new CRC. In an embodiment, the tag will recalculate the CRC-16 over the number of bits left after truncation (i.e. the number of bits indicated by the new Length Bits field). The input to the CRC calculation will be new Length Bits field and the all-zero version of the leftover bits.

Figure 7B:
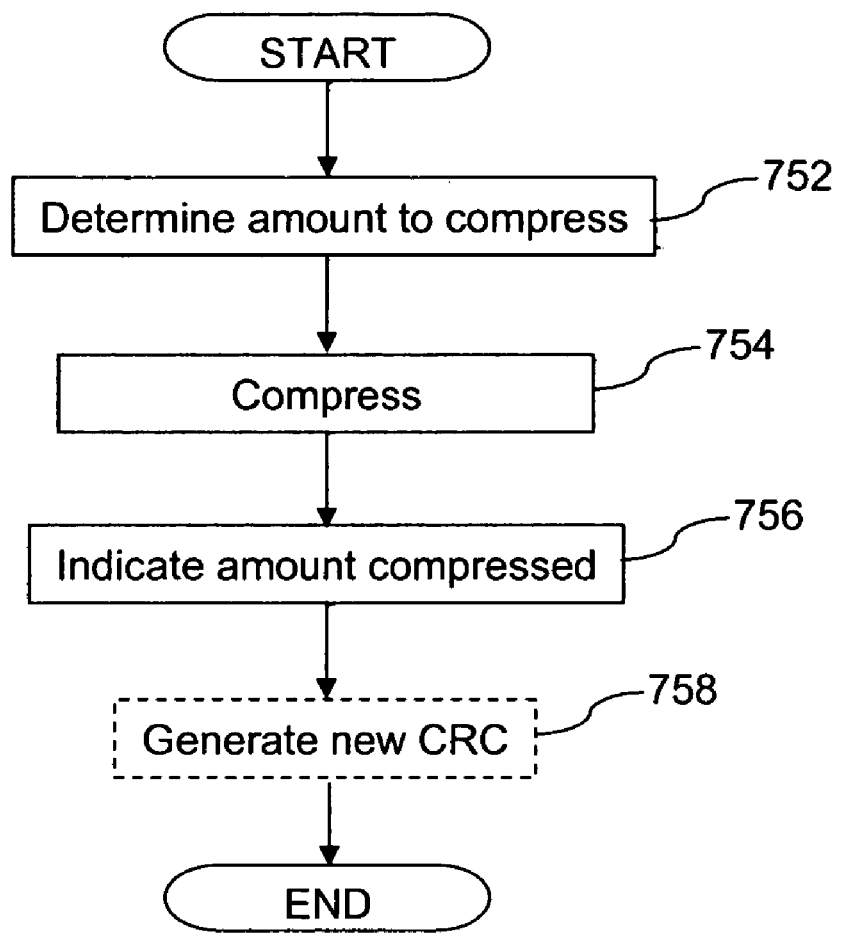

Similarly, FIG. 7B shows flowchart 750 illustrating an example embodiment of tag 202 in TCM; it will compress and modify its responses to indicate to reader 204 that the reply is in fact compressed. A compressed, rather than absent (after truncation) serial number raises other compatibility issues when ensuring the TCM mode tag 202 response is not misinterpreted by either reader 204 or non-enhanced reader 104.

Flowchart 750 begins with step 752. In step 752, a tag determines the amount to compress. In an embodiment, tag 202 in TCM mode compresses a specified number of trailing bits depending on the format of the tag data. For example, the serialized data may be compressed; thus, if the tag ID is SGTIN-96, tag 204 may lookup based on the ID type as indicated in the Header, and compress the message to a length of 4 words instead of 6. As discussed above, in an embodiment using the explicit command from reader 204, a new Header type is defined (e.g., a "SGTIN-96 Compressed" header value) for each mode (trailing compressed, truncated, encrypted, etc.). Reader 204 commands tag 202 to TCM with a specified compression length. Tag 202 has thus been told what the Length Bits field value will need to be.

In step 754, the tag compresses the response using various compression algorithms as described elsewhere herein. Since the Length Bits define a length in 16-bit words, the last word may include the final bits of the serial number that is now being compressed. Although these leftover bits can be unambiguously parsed-away by the application, in an embodiment, the compression algorithm may specify a "padding" method so that an integral number of 16-bit Words can be transmitted.

In step 756, the tag indicates the amount compressed. As discussed above, in an embodiment using an explicit command from reader 204, a new Header type is defined (e.g., a "SGTIN-96 Compressed" header value) for each mode (trailing compressed, truncated, encrypted, etc.). Reader 204 will recognize the header value and properly process the tag 202 response. Non-enhanced reader 104 will reject the response as an unsupported header type. Similar to the truncation case, another embodiment using an implicit command uses the Length Bits field to identify when trailing bits have been compressed.

In an exemplary embodiment using the Gen 2 specification, some additional considerations raised by compression are: if compression fails to reduce the data length to the point where it can be reflected in the Length Bits field, then the tag should not compress the data (i.e. the tag should only use uncompressed data); the data should not be compressed to the point that the Length Bits indicate a non-serialized tag 202; and during production and before the tag 202 enters the supply chain, the use of compressed mode could result in an ambiguous situation where a compressed tag 202 is not distinguishable from a partially serialized tag. Compression should not be used in this last case. Once tag 202 enters the supply chain, a partial serial number no longer has a meaning and would be rejected by unaware systems, thus the ambiguity is resolved.

In optional step 758, the tag may generate a new CRC. In an embodiment, the tag will recalculate the CRC-16 over the number of bits left after truncation (i.e. the number of bits indicated by the new Length Bits field). The input to the CRC calculation will be new Length Bits field and the all-zero version of the leftover bits. In another embodiment, the original CRC is used. A non-enhanced reader 104 will reject the response as transmission error, but a enhanced reader 204 can expand the data and re-check the CRC-16. In another embodiment, the CRC is modified.

Optional step 758 addresses a potential issue: A non-enhanced reader 104 may "overhear" or receive a compressed response from tag 202 which was commanded by a reader 204. This may be permissible in an embodiment. In another embodiment, this is undesirable. To prevent non-enhanced reader 104 from overhearing a response elicited from tag 202 by reader 204, a response by tag 202 when in TCM should be defined to appear invalid to non-enhanced reader 104. This can be accomplished in many ways. For example:

(a) calculate the CRC-16 for the compressed response, then alter it in a predefined manner, e.g., XOR it. Reader 204 will expect the altered (e.g., XORed) CRC-16, but non-enhanced reader 104 will reject the response.

(b) calculate the CRC-16 for the original (uncompressed) data. A non-enhanced reader 104 will reject the response as transmission error, but a enhanced reader 204 can expand the data and re-check the CRC-16.

For some hardware implementations, the first approach will require less time for the reader to validate the transmission of tag 202, and thus may be desirable.

Example Application Layer Module Embodiments

In an embodiment, controller 402 includes an application-layer module 408, as shown in FIG. 4B. In an embodiment, Application layer module 408 functions to insulate application software from the details of any truncation, compression, or encryption which may be occurring. Existing applications may not accept tag information that has been truncated, partially compressed, or encrypted. Some applications may require the RFID tag information to be fully recreated in its original form. Other applications may not use the part of the tag data which had been truncated, encrypted, or compressed. In these cases, application layer module 408 functions to ensure that application software is presented with tag data of the appropriate format and content.

Application-layer module 408 includes an interface 412 and a processor 410. Application-layer module 408 receives tag response data at interface 412 from reader 204. In an embodiment, interface 412 receives data directly from receiver 404. In another embodiment, interface 412 receives tag data via controller 402. In yet another embodiment, interface 412 receives tag data indirectly. In an embodiment, the interface includes dedicated hardware for the application layer module. In another embodiment, the interface shares hardware with other components of the reader.

Interface 412 accepts tag data and formats it for processor 410. Processor 410 need not be a discrete dedicated processor, i.e. processor 410 may actually be a processor in controller 402 that may also perform other functions, i.e. the application layer module shares a processor with other components of the reader 204. Processor 410 analyzes tag data and determines the mode of the sending tag 202. In an embodiment, processor 410 may receive tag data from a non-enhanced tag 102. Processor 410 may be implemented in hardware, software, firmware, or any combination thereof.

In an embodiment, tag response 211 includes an explicit indication of tag mode. Processor 410 interprets the explicit indication. In another embodiment, tag response data 211 includes an implicit indication of tag mode. Processor 410 interprets the implicit indication.

Processor 410 may take any of several actions depending on tag mode. In an embodiment, if the tag mode is TTM, processor 410 fills in at least a portion of the truncated second plurality of bits 308. In another embodiment, processor 410 populates a data field indicating the second plurality of bits has been truncated, thus providing an indication to the user and/or the larger system the status of tag data. Processor 410 may do both: populate a data field and fill in at least a portion of the truncated second plurality of bits 308.

Similarly, if the tag mode is TCM or TEM, in an embodiment, processor 410 may recreate at least a portion of the second plurality of bits 308. In another embodiment, processor 410 may populate a data field indicating that the second plurality of bits 308 has been compressed or encrypted, as appropriate, thus providing an indication to the user and/or the larger system the status of tag data. Processor 410 may do both: populate the data field and recreate at least a portion of the encrypted or compressed second plurality of bits 308.

An embodiment of application layer module 408 and how it operates in relation to an existing specification is described to aid understanding of the basic principles which apply to any data standard. For example, the Gen 2 specification does not clearly define a use for the partially truncated tag 202 reply. Therefore the reply may be left as-is through the lower layers of the application interface. However, the data may need to be converted to a standard form at some point.

Similarly, an implicit extension to the tag data specification can use a Length field to indicate compressed serialization. In systems where middleware layers are not designed specifically to reject partially-encoded tag replies, the bit-level reply is represented as-is, up through the lower layers of the application interface. For example, using a "shortened" sGTIN-96, for example, the EPCglobal Tag Data Standard describes how to convert an SGTIN-96 to two data items: an EAN.UCC GTIN-14, and a Serial Number. However, the EPCglobal decoding algorithm does not include an initial step of checking the Length Bits. However, at some point, the compressed data may be decompressed.

In an embodiment of application layer module 408 capable of decoding standard and truncated tag data, the Length Bits are examined, and the resulting word length is compared to the bit length implied by the Header. For example, if the Length Bits indicate fewer bits than are needed to fully represent the data structure defined by the Header, then the ID has been compressed. If the Length Bits indicate exactly the number of words required to represent the non-serialized portion of the data structure, then the ID has been truncated. In another embodiment, the compressed or truncated serial number format has been assigned a unique header pattern, and this examination of the Length Bits may be unnecessary.

The GTIN-14 portion may be the only portion recreated from a truncated ID. The GTIN-14 can be assigned an Application Identifier (AI) of "01", and treated as a standard data item on its own. An application system may choose to go further, however, in distinguishing this TTM tag data from standard tag data. One way to do this, is to convert a received shortened ID to a barcode-emulation format. For instance, the data may be prefaced with "]C101" to emulate a UCC/EAN-128 barcode carrying the non-serialized ID.

Compressed responses 211 (from a tag 202 in TCM) are treated similarly in an embodiment implemented in the context of the Gen 2 specification. An implicit extension can utilize the length bits to indicate compressed serialization, utilizing the rules above to resolve ambiguities, as described below. Decompression of the compressed data to a standard form can be done in two stages: the data is first expanded to a standard sGTIN-96, then later translated in a standard fashion to EAN.UCC data items such as AI (01) and AI(21). Alternately, the compressed bitwise data can be expanded and converted to standard data items during the same processing step.

The EPCglobal decoding algorithm does not include an initial step of checking the Length Bits, however. An algorithm capable of decoding standard, truncated, and compressed tag data may first examine the Length Bits, and compare the resulting word length to the bit length implied by the Header. If the Length Bits indicate fewer 16-bit words than are needed to fully represent the data structure defined by the Header, but more words than would be needed to represent non-serialized data, then the ID has been compressed. Again, this restriction on the word length is only required in implicit-extension systems that need to discriminate between truncated and compressed tags. If instead the compressed-serial number format has been assigned a unique header pattern, then this examination of the Length bits may be unnecessary. Similarly, an encrypted format can be assigned a unique header pattern; alternately, if the Length Bits indicate more 16-bit words than are needed to fully represent (in standard form) the data structure defined by the Header, then the ID has been encrypted.

Example Compression Embodiments

In embodiments which compress the trailing bits in the tag 202 response, many known compaction techniques may be used. For example, some general-purpose compression techniques such as those based on the Limpel Ziv Welch (LZW) algorithms may be used even though they are seldom effective on very short messages (such as a 20-character serial number). An example of a compression method well suited for compressing shorter messages typical in today's RFID tags is a "multi-base" compaction technique, as disclosed in U.S. Pat. No. 6,196,466, incorporated herein by reference in its entirety.

A multi-base compaction technique improves the encoding of a random sequence of numbers and letters with a moderate cost in computation. It takes advantage of the observation that many kinds of data, such as alphanumeric data, can be classified into subsets of substantially different size (in this case, 10 digits vs 32 alpha/punctuation characters). It would be optimal to encode all of the digits at an average of about 3.3 bits per character, and all of the remaining characters at about 5 bits per character. Typical character-level encoding schemes do not reach these optima, because they need to provide for "latch" and "shift" patterns to handle the random mix between character classes. As disclosed in the patent cited above, an improved method is to provide an initial bit pattern serving as a "character map" for the remaining data to be encoded (where for example, each '0' represents a digit and each '1' represents an alpha character). Following the character map, all of the digits of the message can be aggregated into one large binary number (at the optimal rate of 3.3 bits per digit), then all the members of the other base can be similarly aggregated (in this case, as groups of 5 digits per character for simplicity). Given the constraints of computation in current low-cost RFID tags, it may be preferable to group the base-10 data into groups of 10 digits, each being a near-optimal representation of 3 digits. If 1 or 2 digits remain after the last group of 3, then these are encoded less-optimally as 4 or 7 digits, respectively. Including the overhead of the character map itself, digits will be encoded using an average of 4.33 bits, and alpha/punctuation will be encoded at an average of 6 bits, a clear savings over the seven bits per character when not compressed.

Of course, as RFID tag hardware progresses in complexity and capacity, the potential size of the messages will also increase. LZW-based techniques may become more suitable as the message size grows. Specific implementations of embodiments will take this into account when selecting a particular compression method.

Additional gains may be had by combining a general purpose compression method (multi-base, LZW, etc.) with an implementation-dependent algorithm tailored to the specific characteristics of the particular RFID data standard. This may be described in the context of an existing RFID data standard. For example, the Gen 2 tag data specification uses a fixed-length design. The serial number to be encoded is variable length (from 1 character up to 20). However, the number of tag bits devoted to serialization is fixed for a given tag format and non-serialized ID length. This typically causes significant runs of '0' bits to be added for padding, but the position of these padding bits depends on the specific data structure. For example:

SGTIN-96 encodes 38 bits of serialization (including leading zero bits added as needed to total 38)

SGTIN-198 encodes 140 bits of serialization (at seven bits per character, padded with trailing all-zero bit patterns as needed to total 140)

SSCC-96 represents an 18-digit identifier (a company prefix plus as many digits of "serial reference" as needed to total 18 digits). The tag encoding of this data structure always ends with twenty-four '0' bits after the "serial reference". In addition, the "serial reference" portion (anywhere from 18 to 38 bits, depending on company prefix) may include a large number of leading zero bits, but these follow the MSB bits from a leading "extension digit" which may be non-zero.

Since the data type in a Gen 2 embodiment is itself indicated in each tag via its Header bits, each compressed serialization may be encoded with a few bits for a zero-run-length indicator, instead of actually encoding the padded zero bits. The position of the run of zeros can be determined from the Header, using the rules set forth above. For example, the number of bits devoted to the run-length indicator is specified, and one of skill in the art will recognize that this choice will involve a cost/benefit tradeoff, considering both the complexity of decoding and the number of bits reserved for this purpose, versus the expected average length of the zero runs. As one example, a designer might choose to define the compressed serialization as starting with 5 bits when used in the 96 bit data structure (denoting from 0 to 31 contiguous '0' bits), but starting with 4 bits when used in an SGTIN-198 structure (denoting from 0 to 15 seven-bit patterns of all-zero bits). Further, suppressing the trailing 24 zero bits in an SSCC-96 would be assumed in the compressed version, and would not need to be specifically indicated in the compressed bit pattern.

For the SGTIN-96 and SSCC-96 data structures the remaining serialized data after the run-length encoding of the padded '0' bits is an efficient encoding of all-numeric data, and would not benefit from additional compaction techniques. However, this is not true of the SGTIN-198 data structure, even after suppressing the run-length-encoded all-zero patterns. The remaining characters would still be represented at seven bits per character, which is less than optimal for typical serial number data. Such data tends to consist primarily of digits (which optimally should require only about 3.3 bits per digit) mixed more-or-less randomly with uppercase Alpha characters and with the occasional '-' or '/' or similar separator (which all together should require about 5 bits per non-digit character). The seven-bit representation in the Gen 2 spec also accommodates rarely-used lowercase alpha and punctuation characters, but this capacity is wasted (resulting in wasted transmission bandwidth) in most situations. Thus, even after run-length encoding of the padding, the compressed version of the SGTIN-198 data structure will implement an additional compaction technique to further reduce transmission times. Many known compaction techniques could serve fairly well for this purpose, but the example multi-base compaction is particularly effective.

An implementation of an embodiment will need to take similar consideration into account depending on the particulars of the data specification used. Embodiments using future data specifications will also involve similar considerations.

Conclusion

While various embodiments of the present invention have been described above, it should be understood that they have been presented by way of example only, and not limitation. It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the following claims and their equivalents.

What is claimed is:

1. A radio frequency identification (RFID) tag, comprising:
   a receiver configured to receive a signal from a reader;
   a storage module capable of storing tag data, wherein the tag data comprises a first bit pattern and a second bit pattern;
   a logic module configured to generate a response to the received reader signal, wherein the logic module is configured to generate the response to include the first bit pattern and the second bit pattern formatted according to one of a plurality of data format modes, wherein the plurality of data format modes includes a first data format mode and a second data format mode, wherein in the first data format mode the second bit pattern is altered, wherein in the second data format mode the second bit pattern is unaltered; and
   a transmitter configured to transmit the response to the received reader signal, wherein the response comprises the first bit pattern in all of the plurality of data format modes and the second bit pattern based on a current data format mode of the plurality of data format modes.

2. The tag of claim 1, wherein the plurality of data format modes includes a trailing truncate data format mode wherein the second bit pattern is truncated.

3. The tag of claim 1, wherein the plurality of data format modes includes a trailing compress data format mode wherein the second bit pattern is compressed.

4. The tag of claim 1, wherein the plurality of data format modes includes a trailing encrypt data format mode wherein the second bit pattern is encrypted.

5. The tag of claim 1, wherein the logic module determines the data format mode based on the currently received reader signal.

6. The tag of claim 1, wherein logic module determines the data format mode based on the currently received reader signal and the current data format mode.

7. The tag of claim 1, wherein the logic module determines the number of bits in the second bit pattern based on the data format mode and the currently received reader signal.

8. The tag of claim 3, wherein in the trailing compress data format mode, the second bit pattern is compressed using a multiple numerical base compression technique.

9. The tag of claim 3, wherein the storage module stores a compressed version of the second bit pattern.

10. The tag of claim 4, wherein the storage module stores an encrypted version of the second bit pattern.

11. The tag of claim 3, wherein the logic module determines a compressed version of the second bit pattern.

12. The tag of claim 4, wherein the logic module determines an encrypted version of the second bit pattern.

13. The tag of claim 1, wherein the signal includes an implicit command extension to another command, the implicit command being configured to cause the logic module to generate the response to include the first bit pattern and the second bit pattern formatted according to one of the plurality of data format modes.

14. The tag of claim 1, wherein the signal includes an explicit command to cause the logic module to generate the response to include the first bit pattern and the second bit pattern formatted according to one of the plurality of data format modes.

15. A radio frequency identification (RFID) tag, comprising:
    means for receiving a signal from a reader;
    means for storing tag data, wherein tag data comprises a first bit pattern and a second bit pattern;
    means for generating a response to the received reader signal, wherein the response comprises the first bit pattern and the second bit pattern formatted according to one of a plurality of data format modes, wherein the plurality of data format modes includes a first data format mode and a second data format mode, wherein in the first data format mode the second bit pattern is altered, wherein in the second data format mode the second bit pattern is unaltered, and wherein the response comprises the first bit pattern in all of the plurality of data format modes; and
    means for transmitting the response to the received reader signal, wherein the response comprises the first bit pattern and the second bit pattern based solely on a current data format mode of the plurality of data format modes.

16. The tag of claim 15, wherein the plurality of data format modes includes a trailing truncate data format mode wherein the second bit pattern is truncated.

17. The tag of claim 15, wherein the plurality of data format modes includes a trailing compress data format mode wherein the second bit pattern is compressed.

18. The tag of claim 15, wherein the plurality of data format modes includes a trailing encrypt data format mode wherein the second bit pattern is encrypted.

19. The tag of claim 15, further comprising: means for determining the data format mode based on the currently received reader signal.

20. The tag of claim 15, further comprising: means for determining the data format mode based on the currently received reader signal and the current data format mode.

21. The tag of claim 15, wherein the means for generating the response to the received reader signal determines the number of bits in the second bit pattern based on the data format mode and the currently received reader signal.

22. The tag of claim 17, wherein in the trailing compress data format mode, the second bit pattern is compressed using a multiple numerical base compression technique.

23. The tag of claim 17, further comprising: means for storing a compressed version of the second bit pattern.

24. The tag of claim 18, further comprising: means for storing an encrypted version of the second bit pattern.

25. The tag of claim 17, further comprising: means for determining a compressed version of the second bit pattern.

26. The tag of claim 18, further comprising: means for determining an encrypted version of the second bit pattern.

27. A method in a radio frequency identification (RFID) tag for determining a response to a signal, comprising:
    (1) receiving the signal from a reader;
    (2) examining stored data, wherein the stored data comprises a first bit pattern and a second bit pattern;
    (3) determining a data format mode, wherein the determination is based on the received signal;
    (4) assembling a response, wherein the response comprises the first bit pattern and the second bit pattern formatted according to one of a plurality of data format modes, wherein the plurality of data format modes includes a first data format mode and a second data format mode, wherein in the first data format mode the second bit pattern is altered, wherein in the second data format mode the second bit pattern is unaltered; and
    (5) transmitting the assembled response, wherein the assembled response comprises the first bit pattern in all of the plurality of data format modes and the second bit pattern based on a current data format mode of the plurality of data format modes.

28. The method of claim 27, wherein the plurality of data format modes includes a trailing truncate data format mode, wherein if the data format mode is determined to be the trailing compress data format mode, step (4) comprises truncating the second bit pattern.

29. The method of claim 27, wherein the plurality of data format modes includes a trailing compress data format mode, wherein if the data format mode is determined to be the trailing compress data format mode, step (4) comprises compressing the second bit pattern.

30. The method of claim 27, wherein the plurality of data format modes includes a trailing encrypt data format mode, wherein if the data format mode is determined to be the trailing encrypt data format mode, step (4) comprises encrypting the second bit pattern.

31. The method of claim 27, wherein in step (3), the determination is based on the received signal and the current data format mode.

32. The method of claim 27, wherein the number of bits in the second bit pattern number is based on the current data format mode.

33. The method of claim 29, wherein step (4) comprises: compressing the second bit pattern according to a multiple numerical base compression technique.

34. The method of claim 29, wherein the stored data further comprises a compressed version of the second bit pattern.

35. The method of claim 30, wherein the stored data further comprises an encrypted version of the second bit pattern.

36. The method of claim 34, wherein step (4) comprises: retrieving the stored compressed version of the second bit pattern.

37. The method of claim 29, wherein step (4) further comprises: generating the compressed version of the second bit pattern.

38. The method of claim 35, wherein step (4) further comprises: retrieving the encrypted version of the second bit pattern.

39. The method of claim 30, wherein step (4) further comprises: generating the encrypted version of the second bit pattern.

40. A method in a radio frequency identification (RFID) reader for communicating with an RFID tag in a population of RFID tags, comprising
(1) assembling a signal to be transmitted, wherein the signal comprises a command establishing a data format mode;
(2) transmitting the signal to the tag population; and
(3) receiving a response from at least one tag, wherein: if the data format mode is mode requiring altered trailing bits, the response comprises a first bit pattern and an altered second bit pattern, and if the data format mode is normal the response comprises a first bit pattern and an unaltered second bit pattern, wherein the first bit pattern is unaltered regardless of the data format mode.

41. The method of claim 40, wherein if the data format mode is trailing truncate, the response comprises a truncated second bit pattern.

42. The method of claim 40, wherein if the data format mode is trailing compress, the response comprises a compressed second bit pattern.

43. The method of claim 40, wherein if the data format mode is trailing encrypt, the response comprises an encrypted second bit pattern.

44. The method of claim 43, wherein the signal comprises a parameter indicating the number of bits in the first bit pattern.

45. The method of claim 40, further comprising: (4) decoding the response, wherein the decoded response includes an indication of the tag mode.

46. The method of claim 45, wherein step (4) further comprises: insulating applications from responses in a trailing truncate data format.

47. The method of claim 45, wherein step (4) further comprises: insulating applications from responses in a trailing compress data format.

48. The method of claim 45, wherein step (4) further comprises: insulating applications from responses in a trailing encrypt data format.

49. The method of claim 40, wherein step (1) comprises: forming the command as an implicit command extension to another command.

50. The method of claim 40, wherein step (1) comprises: forming the command as an explicit command to establish the data format mode.

51. An application-layer module in a radio frequency identification (RFID) system, comprising:
an interface coupled to a reader, wherein the interface is configured to receive a tag response from the reader; and
a processor coupled to the interface, wherein the processor is configured to receive tag data from the interface and format it for use by an external application, wherein if the processor determines that the trailing bits of the tag response were altered based on one of a plurality of modes operating between the tag and the reader, the processor is configured to populate a second bit pattern, wherein the plurality of modes comprise normal, trailing compress, trailing truncate, and trailing encrypt, and wherein the tag response comprises a first bit pattern in all of the plurality of modes and the second bit pattern based on a current mode of the plurality of modes.

52. The application-layer module of claim 51, wherein if the processor determines that the trailing bit pattern of the tag response was truncated, the processor generates an untruncated version of the truncated bit pattern.

53. The application-layer module of claim 51, wherein if the processor determines that the trailing bit pattern of the tag response was compressed, the processor generates an uncompressed version of the compressed bit pattern.

54. The application-layer module of claim 53, wherein processor generates the uncompressed version of the compressed bit pattern using a multiple numerical base decompression technique.

55. The application-layer module of claim 51, wherein if the processor determines that the trailing bit pattern of the tag response was encrypted, the processor generates an unencrypted version of the encrypted bit pattern.

56. An application-layer module in a radio frequency identification (RFID) system, comprising:
means for receiving a tag response from a RFID reader; and
means for formatting tag data for an external application, wherein if the formatting means determines that the trailing bits of the tag response were altered based on one of a plurality of modes operating between the tag and the RFID reader, the formatting means populates a second bit pattern, wherein the plurality of modes comprise normal, trailing compress, trailing truncate, and trailing encrypt, and wherein the tag response comprises a first bit pattern in all of the plurality of modes and the second bit pattern based on a current mode of the plurality of modes.

57. The application-layer module of claim 56, wherein if the formatting means determines that the trailing bits of the tag response were truncated, the formatting means generates an untruncated version of the truncated bit pattern.

58. The application-layer module of claim 56, wherein if the formatting means determines that the trailing bits of the tag response were compressed, the formatting means generates an uncompressed version of the compressed bit pattern.

59. The application-layer module of claim 58, wherein the formatting means generates the uncompressed version of the compressed bit pattern using a multiple numerical base decompression technique.

60. The application-layer module of claim 56, wherein if the formatting means determines that the trailing bit pattern of the tag response were encrypted, the formatting means generates an unencrypted version of the encrypted bit pattern.

* * * * *

UNITED STATES PATENT AND TRADEMARK OFFICE
CERTIFICATE OF CORRECTION

PATENT NO. : 8,188,839 B2
APPLICATION NO. : 11/529606
DATED : May 29, 2012
INVENTOR(S) : Schuessler et al.

It is certified that error appears in the above-identified patent and that said Letters Patent is hereby corrected as shown below:

In the Specifications:

In Column 9, Line 67, delete ""[p]roprietary" and insert -- "proprietary --, therefor.

Signed and Sealed this
First Day of January, 2013

David J. Kappos
*Director of the United States Patent and Trademark Office*